W. H. KUHN & S. MILLER.
COMBINED HARROW AND CLOD-CRUSHER
No. 188,379.            Patented March 13, 1877.
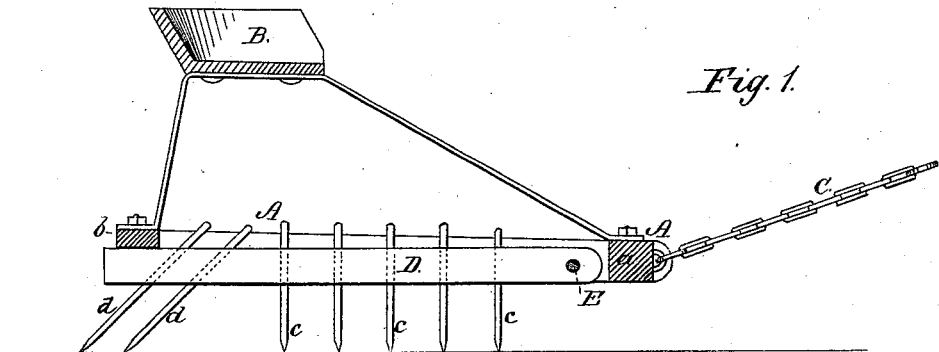
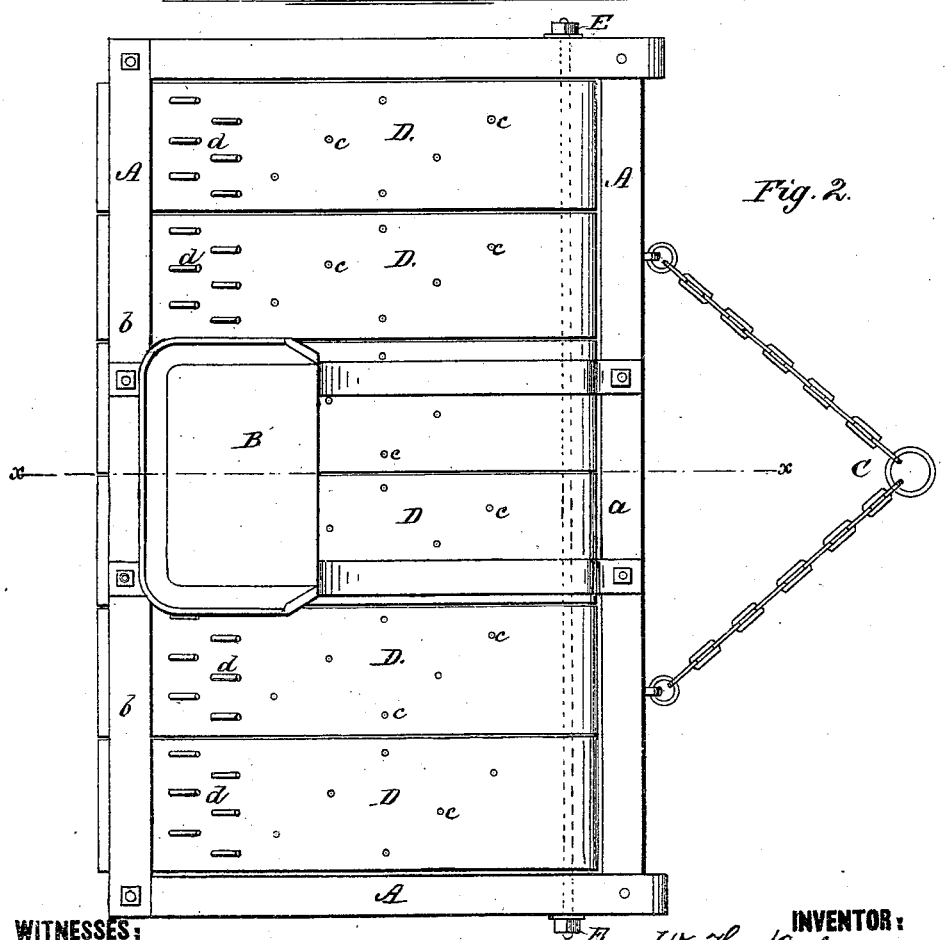

UNITED STATES PATENT OFFICE.

WILLIAM H. KUHN AND SAMUEL MILLER, OF ALBANY, OREGON.

IMPROVEMENT IN COMBINED HARROW AND CLOD-CRUSHER.

Specification forming part of Letters Patent No. 188,379, dated March 13, 1877; application filed January 31, 1877.

*To all whom it may concern:*

Be it known that we, WILLIAM H. KUHN and SAMUEL MILLER, of Albany, in the county of Linn and State of Oregon, have invented a new and Improved Combined Harrow and Clod-Crusher; and we do hereby declare that the following is a full, clear, and exact description of the same.

The object of our invention is to furnish an improved implement for harrowing the soil and crushing and pulverizing clods. To this end it is constructed in sections, which are provided with teeth, and hinged in such manner that one or all of the sections may be detached as required, for the purposes hereinafter stated, likewise to enable the whole weight of the frame and the driver to be imposed upon any one section when passing over a clod or other obstacle.

In the accompanying drawing, forming part of this specification, Figure 1 is a cross-section on line $x\ x$ of Fig. 2. Fig. 2 is a plan view.

The frame A of the harrow is oblong and rectangular in form, and a driver's seat, B, and draft-chain C are suitably attached to it, as shown. The toothed sections D are pivoted on the rod E, which passes through the end bars of the frame A at a point contiguous to the front side bar $a$ thereof. The rear side bar $b$ of the frame A rests on the rear ends of the several sections. Each section is an oblong rectangular plank, and provided with two sets of teeth, one set, $c$, being vertical, and the other, $d$, inclined rearward. These several sections lie parallel and close together, thus filling the space between the end bars of the frame A. The sections are capable of independent movement, and hence, when a large clod or other obstacle passes under a particular section its rear end will be raised or pressed upward against the bar $b$ of the frame, thus causing a large share of the superincumbent weight of the latter, and also of the driver occupying the seat B, to be imposed on that section. The result is that the clod will, in most cases, be crushed, disintegrated, or pulverized. Another result of the manner of arranging the sections is that straw, grass, or stubble can be easily removed from the teeth. For this purpose the rear end of frame A is raised and thrown forward (the rod E serving as a pivot) and the sections are then raised one by one and the teeth cleared.

The sections may all be detached from the frame by simply withdrawing the pivot-rod E, thus enabling the harrow to be packed in small space for transportation, storage, &c. Individual sections may be also removed, thus leaving a number of vacant spaces alternating with the remaining sections—as when it is desired to use the implement for cultivating between rows of corn, or other growing crops.

In addition to these and other functional and practical advantages of the implement, it may be constructed at comparatively small cost.

What we claim is—

The improved harrow and clod-crusher formed of a frame, A, and a series of toothed sections, D, hinged independently on the rod E, and extending rearward beneath the bar $b$ of the frame, also provided with two sets of teeth, $c\ e$, the teeth $c$ being at right angles to the beam, and the teeth $d$ inclining rearwardly at an angle of about forty-five degrees, as shown and described, for the purpose specified.

WILLIAM H. KUHN.
SAMUEL MILLER.

Witnesses:
R. S. PRICE,
T. J. STILES.